United States Patent [19]
Onzuka et al.

[11] Patent Number: 5,268,552
[45] Date of Patent: Dec. 7, 1993

[54] WIRECUT ELECTRICAL DISCHARGE MACHINE HAVING INCREASED FEEDER LIFE

[75] Inventors: Keiko Onzuka; Toshimitsu Sakakibara, both of Aichi, Japan

[73] Assignee: Mitsubishi Denki K.K., Tokyo, Japan

[21] Appl. No.: 945,503

[22] Filed: Sep. 16, 1992

[30] Foreign Application Priority Data

Sep. 30, 1991 [JP] Japan .................. 3-251452

[51] Int. Cl.$^5$ ............................................. B23H 7/10
[52] U.S. Cl. ............................................. 219/69.12
[58] Field of Search ............................ 219/69.12, 69.13

[56] References Cited

U.S. PATENT DOCUMENTS

| | | | |
|---|---|---|---|
| 4,559,433 | 12/1985 | Aramaki et al. | 219/69.12 |
| 4,803,327 | 2/1989 | Obara | 219/69.12 |
| 4,896,013 | 1/1990 | Fricke et al. | 219/69.12 |
| 4,945,200 | 7/1990 | Truty et al. | 219/69.12 |
| 4,994,643 | 2/1991 | Truty et al. | 219/69.12 |
| 5,003,148 | 3/1991 | Truty et al. | 219/69.12 |
| 5,089,680 | 2/1992 | Truty | 219/69.12 |
| 5,126,524 | 6/1992 | Moro et al. | 219/69.12 |

FOREIGN PATENT DOCUMENTS

| | | | |
|---|---|---|---|
| 60-90634 | 5/1985 | Japan | 219/69.12 |
| 60-249531 | 12/1985 | Japan | 219/69.12 |
| 61-76216 | 4/1986 | Japan | 219/69.12 |
| 63-120025 | 5/1988 | Japan | 219/69.12 |
| 1-109026 | 4/1989 | Japan | 219/69.13 |
| 2-95517 | 4/1990 | Japan | 219/69.12 |
| 3-121723 | 5/1991 | Japan | 219/69.12 |

*Primary Examiner*—Geoffrey S. Evans
*Attorney, Agent, or Firm*—Sughrue, Mion, Zinn, Macpeak & Seas

[57] ABSTRACT

A wire guide apparatus for an electrical discharge machine (EDM). A movable feeder is placed in contact with a wire electrode, so as to transmit a machining voltage thereto. A workpiece is machined to a desired shape by virtue of electrical discharge between the wire electrode and the workpiece. An eccentric die is moved in cooperation with the feeder so as to change a contact position between the wire electrode and the feeder. Accordingly, the feeder wears more evenly and the life thereof is increased.

14 Claims, 7 Drawing Sheets

WIRECUT ELECTRICAL DISCHARGE MACHINE HAVING INCREASED FEEDER LIFE

BACKGROUND OF THE INVENTION

1. Field of the Invention

The present invention relates to a wirecut electrical discharge machine (EDM) and more particularly to a wire guide apparatus which reduces the wear of a feeder therein for feeding a wire electrode and allows the feeder to be easily replaced.

2. Description of the Background Art

Figure 14:
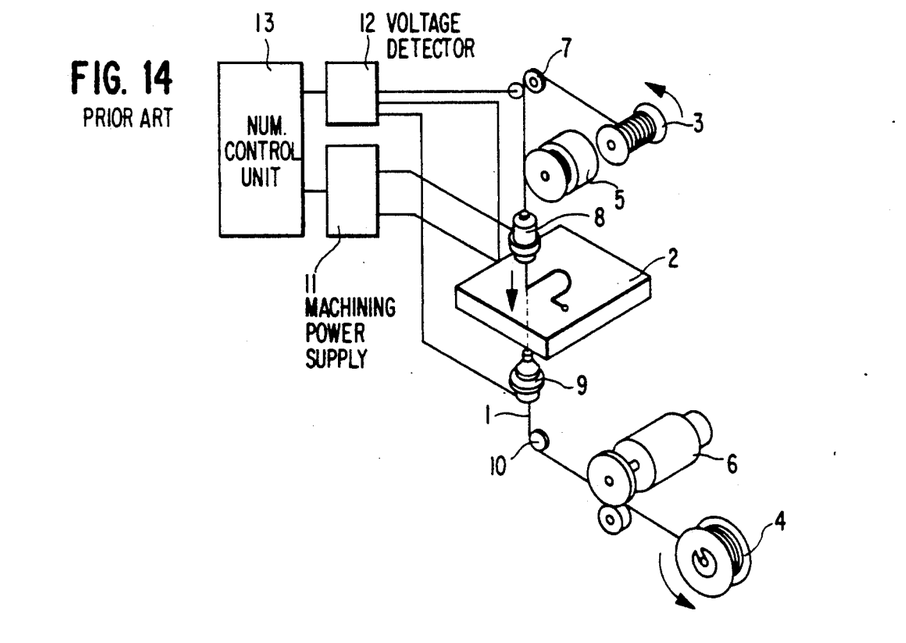
FIG. 14 is a diagram illustrating a wirecut electrical discharge machine known in the art.

FIG. 14 illustrates the key sections of a known wirecut electrical discharge machine, which is provided with a wire electrode 1 (hereinafter referred to as the "wire"), a workpiece 2, a wire supply bobbin 3, a wire take-up bobbin 4, a wire tension controlling electromagnetic brake 5, a wire running speed control motor 6, an upper wire roller 7, an upper wire guide 8, a lower, wire guide 9, a lower wire roller 10, and an electrical discharge machining power supply 11 for supplying a pulse voltage across the wire 1 and workpiece 2 as machining energy. A voltage detector 12 is coupled to machining power supply 11, the wire 1 and the workpiece 2 for comparing an actual gap voltage between the wire 1 and workpiece 2 with the output voltage of the machining power supply 11. A numerical control unit 13 controls the relative motion of the wire 1 with respect to the workpiece 2 and processes the output signals of the detector 12.

Figure 15:
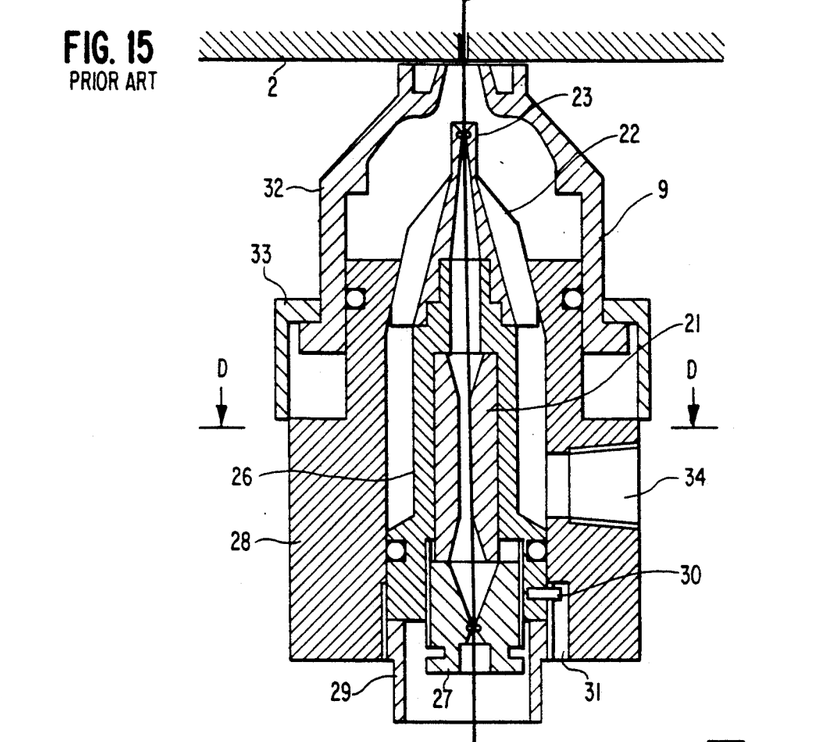
FIG. 15 is a vertical sectional view illustrating a wire guide section known in the art.
Figure 16:
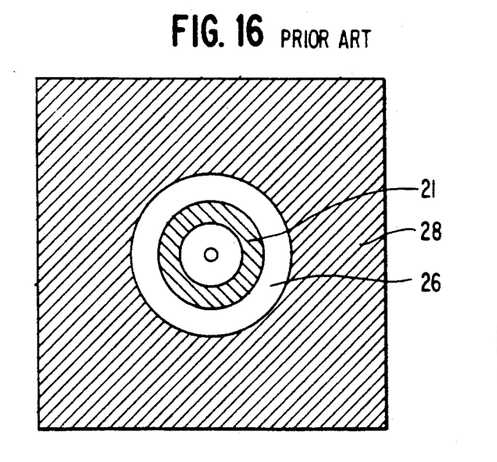
FIG. 16 is a cross sectional view of the wire guide section taken along the plane D—D of FIG. 15.

The lower wire guide 9 will now be described in detail with reference to FIGS. 15 and 16. FIG. 15 is a sectional view illustrating a wire guide similar to that disclosed in Japanese Patent Disclosure Publication No. 249531 or U.S. Pat. No. 4,896,013. FIG. 16 is a detailed sectional view of an electrode guide. A hexagonal feeder 21 made of material such as carbide alloy, tungsten or silver tungsten, and an electrode guide 22 embedded with a die guide 23 made of diamond or sapphire, or the like, are utilized for guiding the wire 1.

Figure 17:
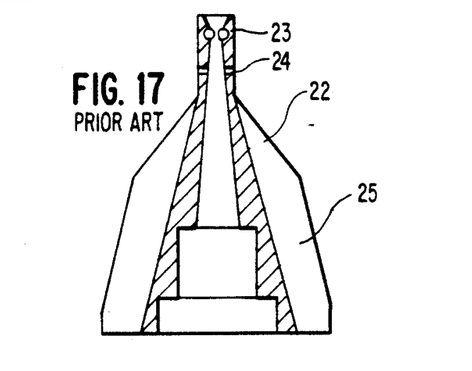
FIG. 17 is a vertical sectional view illustrating an electrode guide known in the art.
Figure 18:
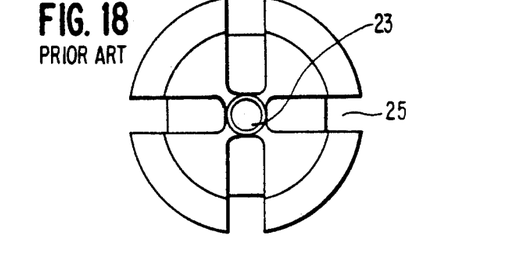
FIG. 18 is a plan view of the electrode guide shown in FIG. 17.

Usually, the electrode guide 22 is also provided above the workpiece 2 as the upper wire guide 8 (see FIG. 14) to guide the wire 1. As shown in FIG. 17, the electrode guide 22 is provided with a small hole 24. Also, several dielectric grooves 25 are provided in the electrode guide 22. A holder 26 accommodates a feeder 21 (see FIG. 15) and inside the holder 26 is provided a hexagonal hole identical to the external shape of the feeder 21 so that the inner hole of the feeder 21 is eccentric with respect to the center of the electrode guide 22. An eccentric die 27 having a guide is fixedly provided below feeder 21 for securing the feeder 21 and bringing the wire 1 into contact with the feeder 21. A case 28 accommodates the holder 26 and a fixing screw (not shown) for securing the holder 26. A locating pin 30 is inserted in a hole formed in the holder 26 so as to insure proper positioning. A groove 31 is provided in the case 28 for maintaining the locating pin 30 in a given positional relationship with respect to case 28. A nozzle 32 for converging dielectric, and a stopper 33, secured to the case 28 for positioning the nozzle 32 in place with respect to the case 28, are also provided in the wire guide 9. 34 indicates a dielectric inlet.

The operation of the prior art apparatus constructed as described above will now be described with reference to FIG. 14, FIG. 15 and FIG. 16.

In wirecut electrical discharge machining, the workpiece 2 is electrically cut into a desired shape, by virtue of the numerical control unit 13 and a drive (not shown) which produces the relative motion of the wire 1 and workpiece 2, with a pulse voltage supplied as machining energy from the electrical discharge machining power supply 11 to a machining gap formed between the wire 1 and workpiece 2. The wire 1 is supplied from the wire supply bobbin 3, travels through the upper wire roller 7, wire tension controlling brake 5, upper wire guide 8, lower wire guide 9, lower wire roller 10 and wire running speed control motor 6, and is then retrieved by the wire take-up bobbin 4.

In the meantime, when a machining pulse voltage from the electrical discharge machining power supply 11 is applied to the wire 1 by the feeder 21 via the holder 26 an electrical discharge occurs between the wire 1 and workpiece 2. Accordingly, a machining pulse current flows through the feeder 21 and wire 1. Since the wire 1 is continuously supplied to the workpiece 2, heat generated by contact resistance between the feeder 21 and wire 1 or an electrical discharge phenomenon occurring due to any separation of the feeder 21 from the wire 1, causes the inner hole of the feeder 21 to wear gradually. This wearing erodes a contact state between the feeder 21 and the wire 1 and, eventually, leads to, a point where there is no contact between the feeder 21 and the wire 1 and therefore machining current cannot be properly fed to the wire. In such a case, the average output voltage of the machining power supply 11 at the detector 12 is raised by the stoppage of the current flow, whereas the voltage across the wire 1 and workpiece 2 is and the voltage detector 12 transmits a signal to the numerical control unit 13, which then stops machining or displays an alarm to change the feeder 21 on a CRT display, or the like (not shown). In such a case, the operator must remove the feeder 21, and manually change its orientation in holder 26.

During machining, some of the dielectric is supplied under pressure by a pump (not shown) into the inlet 34 and fed from the tip of the nozzle 32 to the machined area of the workpiece 2 through the dielectric grooves 25 formed in the electrode guide 22, thereby eliminating machining chips. Dielectric is also fed to the feeder 21 through the small hole 24 provided in the electrode guide 22, so as to suppress heat generated in the feeder section during machining.

To change the position of the worn feeder 21 in the known wirecut electrical discharge machine constructed as described above, it is necessary to stop machining, cut off the wire electrode 1, remove the eccentric die 27 and fixing screw 29, remove the feeder 21, change its angle to alter its contact area and then reassemble the device.

U.S. Pat. No. 4,945,200 discloses an embodiment wherein a feeder is rotated with respect to a wire supplying direction and an embodiment wherein a feeder is slanted. Although the devices disclosed by these references increase the life of the feeder, their arrangement is very complicated, resulting in high cost and difficult feeder replacement.

In the feeder unit disposed in Japanese Patent Disclosure Publication No. 221926, the contact area of a feeder and wire electrode is not cooled sufficiently, leading to a strong probability that the wire electrode will be broken in the feeder section. In addition, the structure of the feeder unit is very complicated which tends to increase its size.

SUMMARY OF THE INVENTION

It is accordingly an object of the present invention to overcome the disadvantages in the prior art by providing a wirecut electrical discharge machine which produces a higher cooling effect on a feeder section by means of dielectric, suppresses the wear of a feeder, and has a wire guide section which is simple in structure.

It is another object of the present invention to provide a wirecut electrical discharge machine which has eliminated the need to cut the wire electrode during feeder replacement and allows simplified disassembly of various parts.

It is a further object of the present invention to provide a wirecut electrical discharge machine which allows machining to continue for a longer time without the need for reducing machining speed due to the wear of a feeder during machining.

In a wirecut electrical discharge machine in accordance with the present invention, an eccentric die for bringing a wire electrode into contact with a feeder moves on a given locus while the feeder remains fixed or moves. Also, a feeder inserting hole is provided in the side face of a wire guide section to insert a feeder supporting part, whereby the feeder can be changed without cutting off the wire electrode. Further, a plurality of feeders are provided so that when the wear of the feeder being employed is detected, the eccentric die moves to bring the wire electrode into contact with another feeder. Further, a second electrode guide may be disposed between the electrode guide and eccentric die to prevent the wire electrode from becoming deflected when the eccentric die moves.

In the wirecut electrical discharge machine arranged as described above, the movement of the eccentric die in a given locus continuously, or intermittently, changes the contact position of the wire electrode and feeder, causing the feeder to wear evenly. Also, when the feeder employed is worn out, the eccentric die can be moved to bring the wire electrode into contact with another one of the plurality of feeders or with another position of the feeder employed. Accordingly, the useful life of the feeder is greatly increased.

DESCRIPTION OF THE PREFERRED EMBODIMENT

Figure 1:
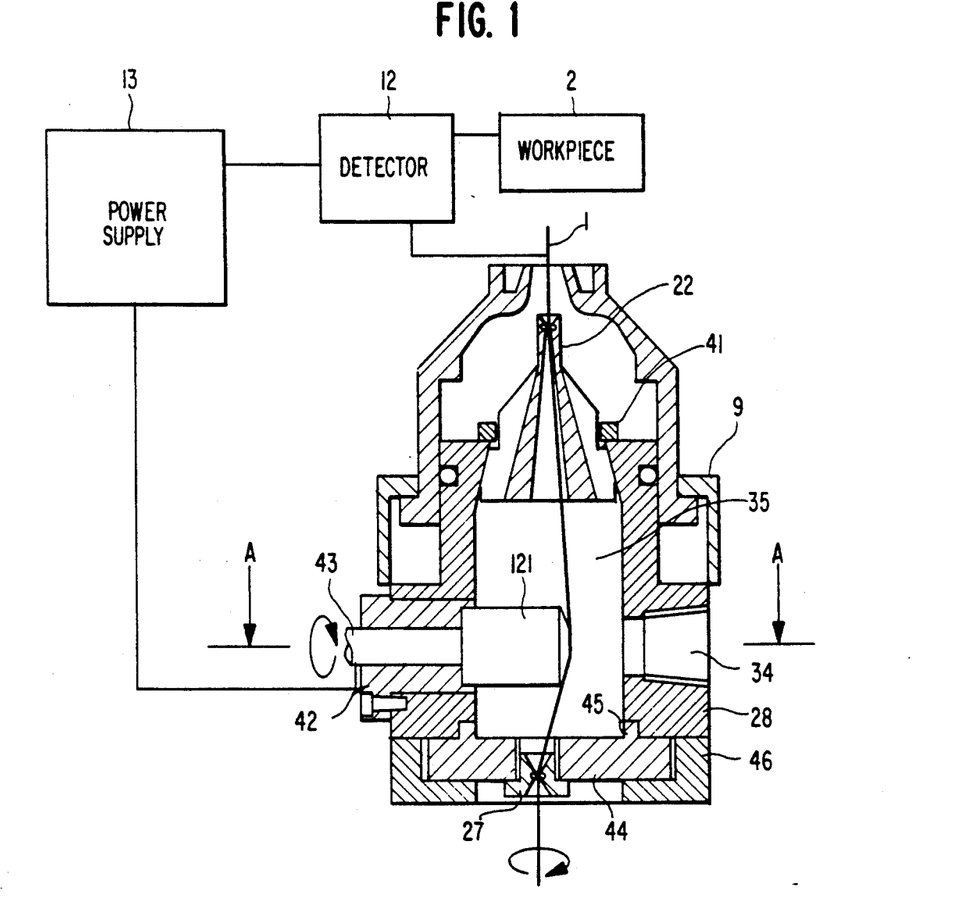
FIG. 1 is a vertical sectional view of a wire guide section illustrating a first preferred embodiment of the present invention.

FIG. 1 is a sectional view of a wire guide section according to the first preferred embodiment of the present invention wherein power supply 13, detector 12 and workpiece 2 are schematically illustrated. Parts which are different in form or function from those discussed above, with respect to the conventional device, will be described in detail.

Wire electrode 1 (hereinafter referred to as the "wire"), extends through electrode guide 22 which is secured with nut 41. Bracket 42 secures a feeder 121 which is mounted on a shaft 43. A cap 44 is engaged with a case 28 of the wire guide section and is provided with a cylindrical projection 45 which is slidable with respect to case 28 so that the cap 44 can be rotated by a drive (not shown). An eccentric die 27 is disposed in cap 44 eccentrically from the center of the cylindrical projection 45. A guide fitting 46 prevents the cap 44 from becoming detached from the case 28 in a vertical direction when it is rotated. It should be noted that a dielectric inlet 34 is provided in the case 28 as in conventional devices. The case 28 has a cooling section 35 for forming a pool of the dielectric introduced from the inlet 34. The contact area of the wire 1 and feeder 121 is located in the cooling section 35.

In the wire guide apparatus of the first preferred embodiment, while machining is being carried out, the feeder 121, supported by the bracket 42 installed in an inserting hole provided in the side face of the case 28, is rotated, either constantly or intermittently, about an axis thereof, by a drive (not shown) via the shaft 43, while the wire 1 is stretched thereacross. When the contact condition of the feeder 121 with the wire 1 deteriorates during machining as the feeder 121 is worn, a voltage detector 12 senses an increase in the average voltage of power supply 13 and a decrease in the voltage across the machining gap and generates a signal to a numerical control unit 13 which then commands the cap 44 to be rotated by the drive (not shown). This changes the position of the eccentric die 27, which then changes a contact relationship between the feeder 121 and wire 1, causing a machining voltage pulse to once again be supplied properly to the wire 1. If the feeder 121 is worn to an extent that it cannot be brought into contact with the wire 1 even by rotation of the cap 44, the bracket 42 secured to the case 28 can be easily removed without affecting the wire 1 and the feeder 121 can be changed.

In the wire guide apparatus of the first preferred embodiment, the feeder 121 is rotated, however, the contact position between the feeder 121 and the wire may be changed solely by moving the eccentric die 27 through the rotation of the cap 44 according to the output of the detector 12, without rotating the feeder 121. Note that the moving locus of the eccentric die 27 may either be circular, linear or of any desired shape.

Figure 2:
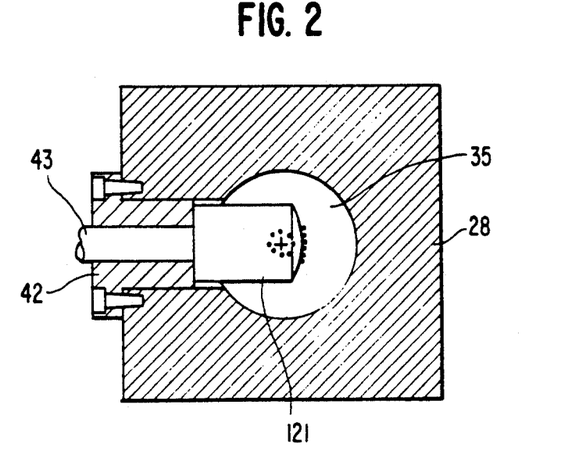
FIG. 2 is a cross sectional view of the wire guide taken along the plane A—A of FIG. 1.
Figure 3:
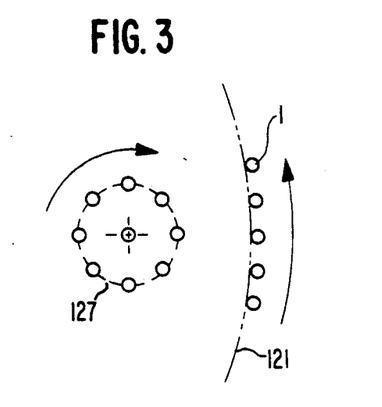
FIG. 3 illustrates a contact state between a feeder and a wire electrode shown in FIG. 1.

FIGS. 2 and 3 illustrate the various contact states between wire 1 and feeder 121 and corresponding positions of wire 21 as it passes through eccentric die 27. In particular, as eccentric die 27 rotates through the circular locus 127 wire 1 contacts feeder 21 at the various positions indicated which correspond to the position of eccentric die 27. Eccentric die 27 can be automatically rotated in pre-programmed increments, in response to a signal from voltage detector 12, or manually as desired.

Figure 4:
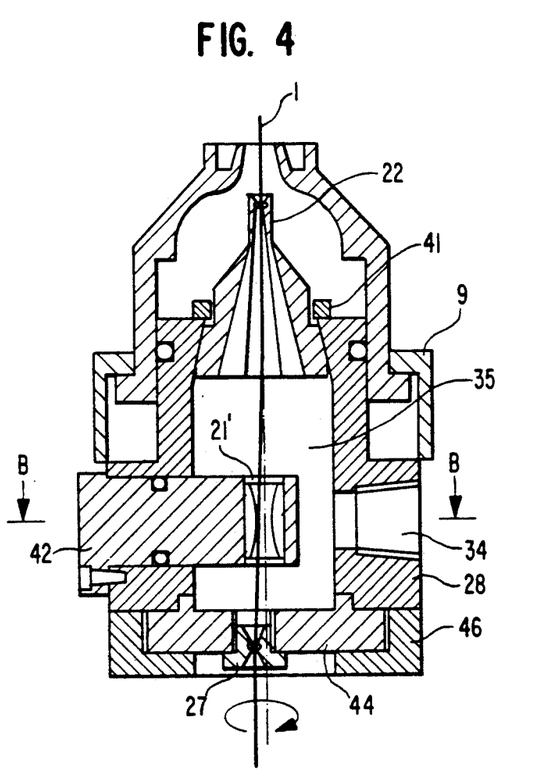
FIG. 4 is a vertical sectional view of a wire guide illustrating a second preferred embodiment of the present invention.
Figure 5:
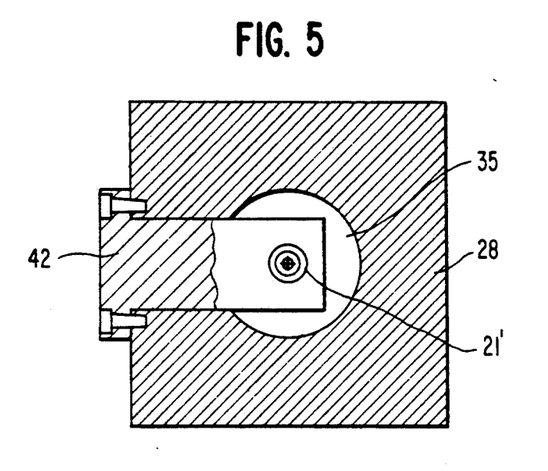
FIG. 5 is a cross sectional view of the wire guide taken along the plane B—B of FIG. 4.

FIGS. 4 and 5 illustrate the second preferred embodiment of the invention wherein a hollow columnar feeder 21' is employed. The cap 44 is continuously rotated to move the eccentric die 27 through a circular locus, thereby changing the contact position between feeder 21' and wire 1.

Figure 6:
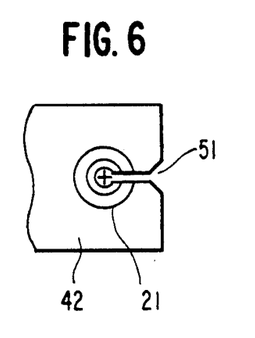
FIG. 6 is a fragmentary plan view illustrating a modification to the second preferred embodiment of the present invention.

By providing a slit 51 in the feeder 21, and bracket 42 as shown in FIG. 6, the bracket 42 and feeder 12 of the second embodiment can be changed without cutting the wire 1. In this case, the moving locus of the eccentric die 27 must be controlled to be only a portion of a closed curve (e.g., semicircle), i.e., the wire electrode 1 must be kept away from the slit 51 during operation.

Figure 7:
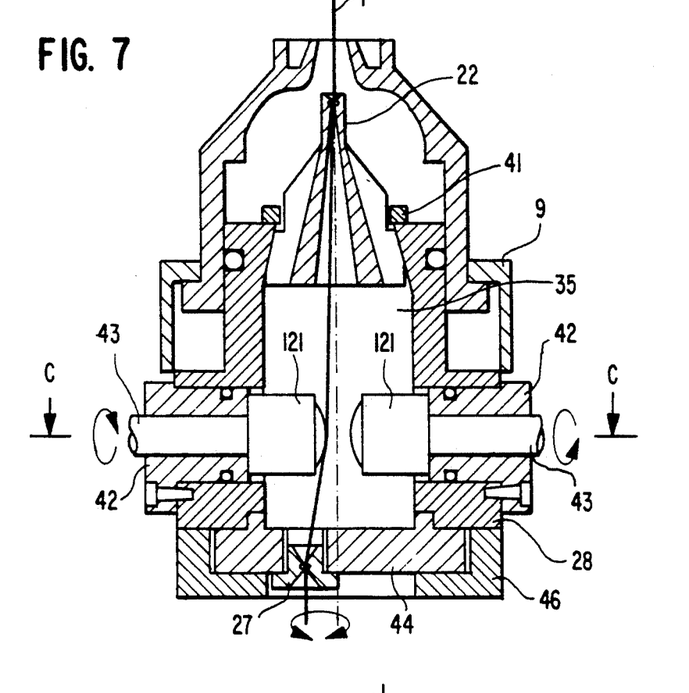
FIG. 7 is a vertical sectional view of a wire guide illustrating a third preferred embodiment of the present invention.
Figures 8, 9:
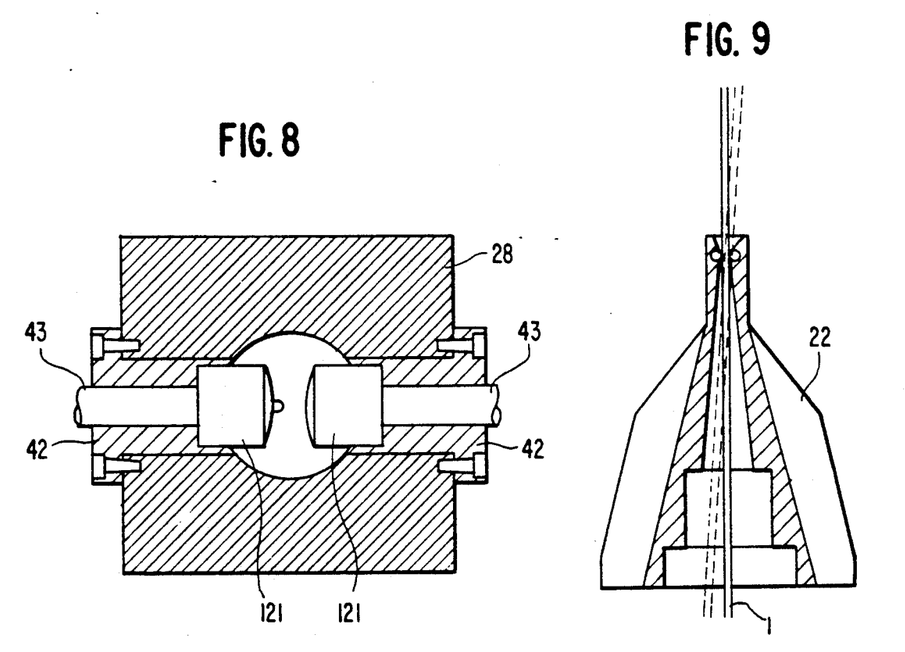
FIG. 8 is a cross sectional view of the wire guide section taken along the plane C—C of FIG. 7.
FIG. 9 illustrates how a wire electrode is deformed.

FIGS. 7 and 8 illustrate the third preferred embodiment. This embodiment includes two rotatable feeders 121 and two corresponding brackets 42 in the case 28. Accordingly, if one feeder 121 is worn out, the position of the eccentric die 27 is changed to the other side to bring the wire 1 into contact with the other feeder 121. In FIG. 7, the eccentric die 27 is moved from left to right to bring the wire 1 into contact with the right-hand side feeder 121.

Figure 10:
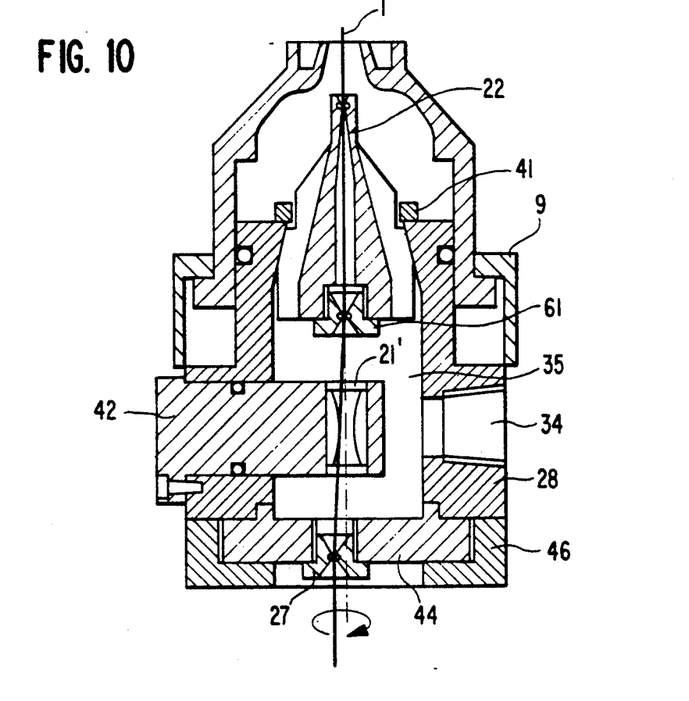
FIG. 10 is a vertical sectional view of a wire guide section illustrating a fourth preferred embodiment of the present invention.

In the embodiments discussed above, the wire 1 will be deflected by the change in contact position of the wire 1 and feeder 121 or 21' as indicated by the broken lines in FIG. 9. FIG. 10 illustrates the fourth embodiment wherein a second electrode guide 61 is added between the electrode guide 22 and feeder 21' to prevent the wire 1 from becoming deflected if the contact position of the wire 1 and feeder 21' is changed.

Figure 11:
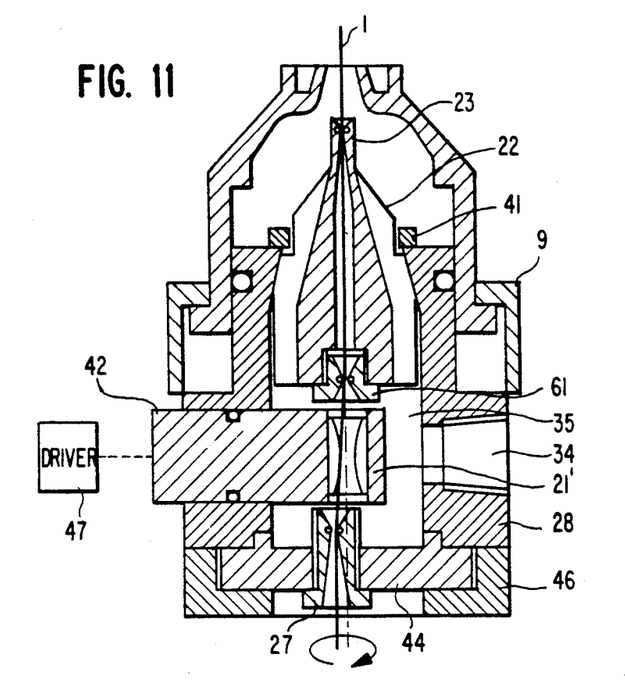
FIG. 11 is a vertical sectional view of a wire guide section illustrating a fifth preferred embodiment of the present invention.

FIG. 11 shows a fifth embodiment which is designed for the automatic insertion of the wire 1. Unlike previous embodiments, the device illustrated in FIG. 11 is designed to bring the wire 1 passing the die guide 23 of the electrode guide 22 into contact with the feeder 21' immediately after the wire 1 has passed the second electrode guide 61. Accordingly, the bracket 42 is moved by a drive (not shown) to align the center hole of the feeder 21' with that of the electrode guide 22. In addition, the entrance of the eccentric die 27 is disposed adjacent to the feeder 21' to ensure that the wire 1 enters the taper of the eccentric die 27 after it has passed the feeder 21'.

When the feeder 21' is worn out in the embodiment illustrated in FIG. 11, the bracket 42 is moved to move the feeder 21', thereby changing the contact position of the feeder 21' with the wire 1. Also, eccentric die 27 may be rotated as discussed above.

Figure 12:
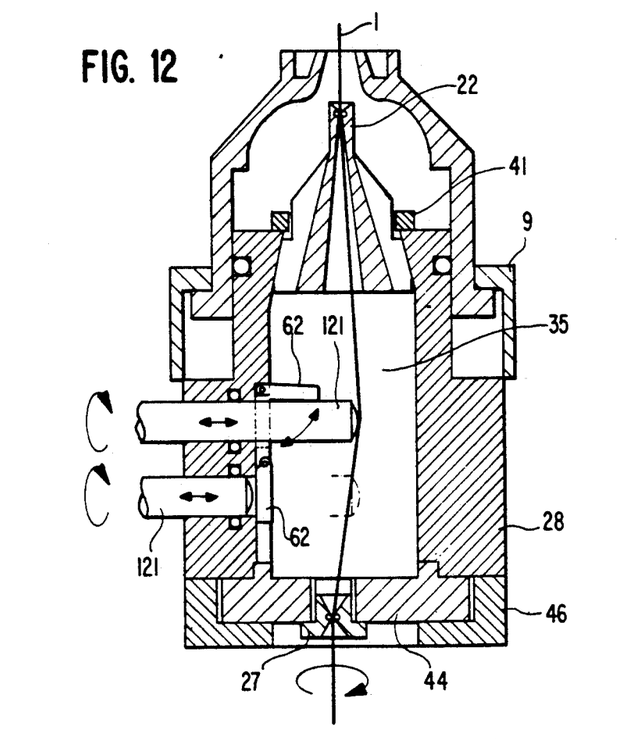
FIG. 12 is a vertical sectional view of a wire guide illustrating a sixth preferred embodiment of the present invention.

A sixth embodiment is illustrated in FIG. 12. This embodiment is designed to prevent dielectric fluid from flowing out of case 28 and to allow a feeder 121 to be changed during machining. Shutters 62 are engaged on a cooling section 35 side of a case 28 by engaging means, such as hinges. Two feeders 121 are provided in case 28 and are axially movable in inserting directions and rotatable by a driving device, not shown. If the lower feeder 121 is worn and its contact state worsens during machining, the upper feeder 121 is thrust into the case 28 by the driving means, whereby both feeders 121 supply the machining power. After a certain period of time has passed, the worn lower feeder 121 is moved by the driving means, so as to be removed to the outside of the case 28. Since the dielectric fluid pressure inside the cooling section 35 is typically several tens of atmospheres during machining, the shutter 62 is pressed toward the inserting hole as the feeder 121 is removed, so that the dielectric fluid is prevented from flowing out. It will be recognized that the feeders 121, which are provided in two places on one side in the present embodiment, may be provided in any direction and in additional places as far as the side faces of the case 28 permit.

Figure 13:
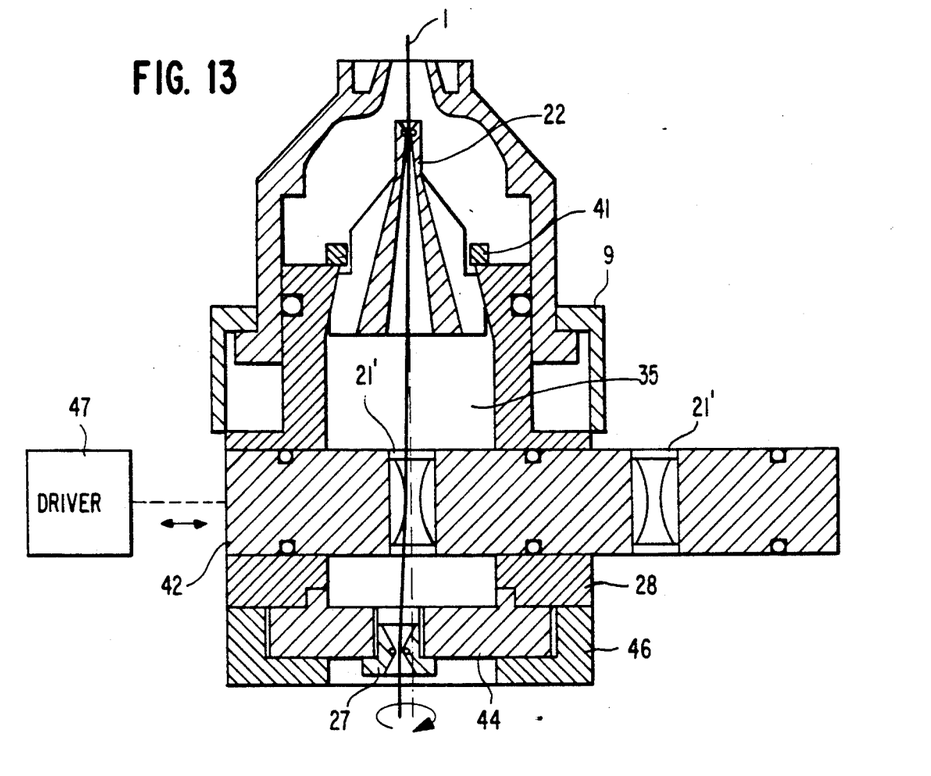
FIG. 13 is a vertical sectional view of a wire guide illustrating the seventh preferred embodiment of the present invention.

A seventh embodiment illustrated in FIG. 13 is also designed to prevent dielectric fluid from flowing out of case 28. A bracket 42 supporting a plurality of feeders 21' is inserted in a case 28 so that if one of the feeders 21' is worn, the bracket 42 is moved to allow the worn feeder 21' to be moved and taken out of the case 28 and the other feeder 21' to be brought into contact with the wire 1 for the continuation of machining. The bracket 42 is long enough to prevent a cooling section 38 of the case 28 from being opened to the outside as a result of its motion, thereby also serving as a seal. The old feeder 21' taken out of the case 28 is changed easily. 47 indicates a drive for driving the bracket 42 in the directions of the arrows.

It will be appreciated that the feeder 121 or 21' and bracket 42 described as individual parts in each of said embodiments may be a single integrally formed component. It will also be appreciated that the above description of the lower wire guide section also applies to the upper wire guide section. It will further be appreciated that the various features of the different embodiments may be combined, as appropriate, according to desired effects.

It will be apparent that the invention, as described above, achieves a wirecut electrical discharge machine which produces the following effects:

By continuously or intermittently moving the eccentric die, the structure of the electrode guide section can be simplified, the dielectric can produce a higher cooling effect, and the feeder is worn evenly, providing a long machining time.

By moving the feeders inward and outward or moving the eccentric die, the wire electrode is brought into contact with any of the plurality of feeders, thereby offering a long machining time.

The feeder inserting portion provided in the side face of the holder allows the feeder to be changed easily during machining when it is worn out.

The die guide provided between the electrode guide and eccentric die prevents the wire electrode from becoming deflected when the feeder contact position is changed, thereby ensuring a high machining accuracy.

The invention has been described through preferred embodiments. However, it will be apparent to those skilled in the art that modifications may be made without departing from the scope of the invention as defined by the appended claims.

What is claimed is:

1. A wirecut electrical discharge machine having a wire guide apparatus positioned at least one of above and under a workpiece, said wire guide apparatus comprising:
    an electrode guide engaged with a wire electrode for guiding said wire electrode;
    a feeder placed in contact with said wire electrode so as to supply machining energy to said wire electrode from an electrical discharge machining power supply;
    an eccentric die engaged with said wire electrode so as to urge said wire electrode into contact with said feeder; and
    driving means for displacing said eccentric die.

2. A wirecut electrical discharge machine as defined in claim 1, further comprising:
    a detector coupled to said feeder so as to detect the wear of said feeder,
    said driving means being operated in response to an output signal of said detector.

3. A wirecut electrical discharge machine as defined in one of claims 1 or 2, wherein said driving means is operated continuously during machining.

4. A wirecut electrical discharge machine comprising:
    an electrode guide engaged with a wire electrode so as to guide said wire electrode;
    a feeder in contact with said wire electrode so as to supply machining energy to said wire electrode form an electrical discharge machining power supply;
    an eccentric die engaged with said wire electrode so as to urge said wire electrode into contact with said feeder; and
    a case for supporting said electrode guide, said feeder and said eccentric die, said case including a cooling section defined therein for cooling the contact area of said wire electrode and said feeder by means of a dielectric fluid contained in said cooling section, said case having, in a side face thereof, means for inserting said feeder into said cooling section.

5. A wirecut electrical discharge machine as defined in claim 4, wherein said feeder is rotatably mounted to said case.

6. A wirecut electrical discharge machine as defined in claim 4, further comprising:
    driving means for imparting at least one of rotary and linear motion to said feeder in response to a signal detecting the wear of the feeder generated by a detector coupled to said feeder, said driving means maintaining contact between said feeder and said wire electrode.

7. A wirecut electrical discharge machine having a wire guide apparatus positioned at least one of above and under a workpiece, said wire guide apparatus comprising:
    an electrode guide engaged with a wire electrode so as to guide said wire electrode;
    a feeder in contact with said wire electrode for supplying said wire electrode with machining energy from an electrical discharge machining power supply;
    an eccentric die engaged with said wire electrode, said eccentric die being movable with respect to said feeder so as to change the contact position of said wire electrode and said feeder;
    a case for supporting said electrode guide, said feeder and said eccentric die in predetermined positions;
    means for inserting said feeder removably into said case; and
    shuttering means for preventing dielectric fluid from flowing into said inserting means.

8. A wirecut electrical discharge machine having a wire guide apparatus disposed at least one of above and, under a workpiece, said wire guide apparatus comprising:
    an electrode guide engaged with a wire electrode so as to guide said wire electrode;
    a plurality of feeders selectively disposed in contact with said wire electrode so as to supply said wire electrode with machining energy from an electrical discharge machining power supply;
    supporting means for supporting said plurality of feeders;
    an eccentric die engaged with said wire electrode so as to change the contact position of said wire electrode with said feeders;
    a case for supporting said electrode guide, said feeders and said eccentric die in predetermined positions;
    means for inserting said supporting means removably into said case; and
    driving means for moving said supporting means.

9. A wirecut electrical discharge machine having a wire guide apparatus disposed at least one of above and under a workpiece, said wire guide apparatus comprising:
    an electrode guide engaged with a wire electrode so as to guide said wire electrode;
    a plurality of feeders selectively disposed in contact with said wire electrode so as to supply said wire electrode with machining energy from an electrical discharge machining power supply;
    an eccentric die engaged with said wire electrode so as to change the contact position between said wire electrode and any of said plurality of feeders;
    driving means for displacing at least one of said eccentric die and said feeders, and
    wherein any of said plurality of feeders is placed in contact with said wire electrode based upon the displacement of at least one of said eccentric die and said feeders.

10. A wirecut electrical discharge machine having a wire guide apparatus disposed at least one of above and under a workpiece, said wire guide apparatus comprising:
    an electrode guide engaged with a wire electrode so as to guide said wire electrode;
    a plurality of feeders selectively placed in contact with said wire electrode for supplying said wire electrode with machining energy from an electrical discharge machining power supply;
    an eccentric die engaged with said wire electrode so as to change the contact position between said wire electrode and any of said plurality of feeders;
    a case for supporting said electrode guide, said plurality of feeders and said eccentric die in predetermined positions;
    means for removably inserting each of said plurality of feeders into said case; and driving means for bringing one of said feeders into contact with said wire electrode when another of said feeders is being removed from said casing.

11. A wire electrical discharge machine having a wire guide apparatus disposed at least one of above and under a workpiece, said wire guide apparatus comprising:

an electrode guide engaged with a wire electrode so as to guide said wire electrode;

a feeder disposed in contact with said wire electrode so as to supply said wire electrode with machining energy from an electrical discharge machining power supply;

an eccentric die with said wire electrode so as to change the contact position between said wire electrode and said feeder, and wherein wire electrode passing holes are formed in said electrode guide, in said feeder and in said eccentric die, said feeder and said eccentric die being relatively positioned so that said passing holes are adjacent to each other when said wire electrode is inserted.

12. A wirecut electrical discharge machine having a wire guide apparatus disposed at least one of above and under a workpiece, said wire guide apparatus comprising:

an electrode guide engaged with a wire electrode so as to guide said wire electrode;

a feeder disposed in contact with said wire electrode so as to supply said wire electrode with machining energy from an electrical discharge machining power supply;

an eccentric die engaged with said wire electrode so as to change the contact position between said wire electrode and said feeder; and a second electrode guide provided between said electrode guide and said feeder.

13. A method of maintaining contact between a wire electrode and a feeder of an electrical discharge machine comprising the steps of:

placing said wire electrode in contact with said feeder in a first contact state; and rotating an eccentric die, which is engaged with said wire electrode, so as to move said wire electrode and place said wire electrode and said feeder in a second contact state.

14. A method of maintaining contact between a wire electrode and a feeder of an electrical discharge machine comprising the steps of:

placing said wire electrode in contact with said feeder in a first contact state; and rotating said feeder about an axis which is essentially perpendicular to said wire electrode so as to place said wire electrode and said feeder in a second contact state.

* * * * *